Feb. 6, 1968   A. B. CRUZ, JR., ETAL   3,367,364
PROSTHETIC HEART VALVE
Filed Oct. 19, 1964

INVENTORS
ANATOLIO B. CRUZ, JR.
ROBERT L. KASTER
BY
Moore, White & Burd
ATTORNEYS United States Patent Office 3,367,364
Patented Feb. 6, 1968

3,367,364
PROSTHETIC HEART VALVE
Anatolio B. Cruz, Jr., Quezon City, Philippine Republic, and Robert L. Kaster, Minneapolis, Minn., assignors to The Regents of the University of Minnesota, Minneapolis, Minn., a corporation of Minnesota
Filed Oct. 19, 1964, Ser. No. 404,860
9 Claims. (Cl. 137—527.8)

ABSTRACT OF THE DISCLOSURE

A heart valve having a circular base formed with a circumferential groove receiving a suture ring. The base has a central circular passage and an upright annular ridge forming a valve seat for a meniscus disc. Secured to the top of the base is a cage in the form of arcuate struts which guide the movement of the disc toward and away from the valve ridge beyond the center line of the passage. One of the struts has a knee portion above a sector of the ridge forming a pocket with a ridge for accommodating a peripheral sector of the disc.

---

This invention relates to a check valve and more particularly to a valve unit having a disc-shaped valve member movable to open and closed positions for controlling the direction of flow of a fluid.

It is the object of the invention to provide an improved check valve operable with a minimum amount of work to control the direction of flow of a fluid.

Another object of the invention is to provide a check valve with a disc shaped valve member having limited universal or floating movement thereby eliminating localized areas of wear and fatigue.

A further object of the invention is to provide a check valve with a valve member operable to prevent flow of a fluid in one direction and which provides a minimum of interference to the flow in an opposite direction.

Still another object of the invention is to provide a check valve with a floating meniscus disc movable to an open position which minimizes the pressure gradient of the moving fluid across the valve opening.

An additional object of the invention is to provide a durable check valve which is simple and sturdy in construction, reliable and efficient in operation and versatile in use.

These and other objects and advantages of this invention will become apparent upon reference to the following description and accompanying drawing, wherein.

Figure 1:
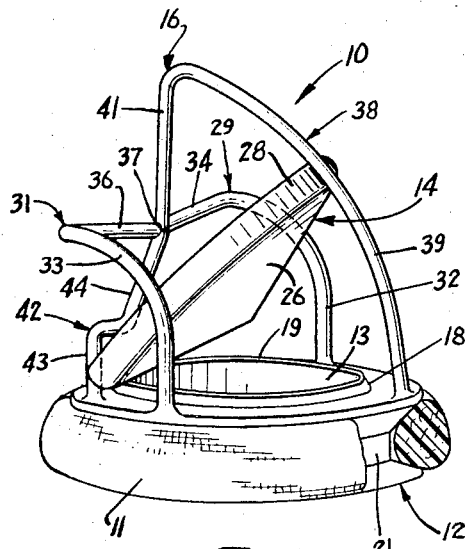
FIGURE 1 is a perspective view of the valve unit of this invention.

Referring to the drawing there is shown in FIGURE 1 the valve unit of this invention indicated generally at 10 in assembled relation with a support 11 illustrated as an annulus of plastic material. The support 11 may be any member capable of supporting the valve unit 10 in a fluid passage.

The valve unit 10 is a check valve operable to block the flow of fluid, liquid or air, in one direction and to provide a minimum of interference to the flow of the fluid in an opposite direction. The valve unit 10 comprises a base 12 of an annular or ring shape having a central opening 13. A disc type valve member 14 is positioned for limited floating or universal movement adjacent the top side of the base and has a diameter which is larger than the diameter of the opening 13. When the valve member 14 is in the closed position it seats on the top of the base 12 and blocks the downward flow of fluid through the opening 13. The valve member 14 is retained in an operative position for limited floating movement adjacent the top of the base 12 by an open cage indicated generally at 16 extended about the valve member 14 and secured to the top of the base. The cage 16 projects upwardly away from the top of the base 12 and is of an arcuate configuration. In the operation of the valve unit 10 the cage 16 functions to limit the movement of the valve member 14 to an arcuate path and prevent external elements from interfering from the movement of the valve member. The base 12 and cage 16 form a one piece metal unit, preferably of stainless steel, or vitallium which when positioned in a fluid line accurately maintain the lightweight valve member 14 in its operative floating positions, open and closed, with respect to the top of the base member 12.

Figure 2:
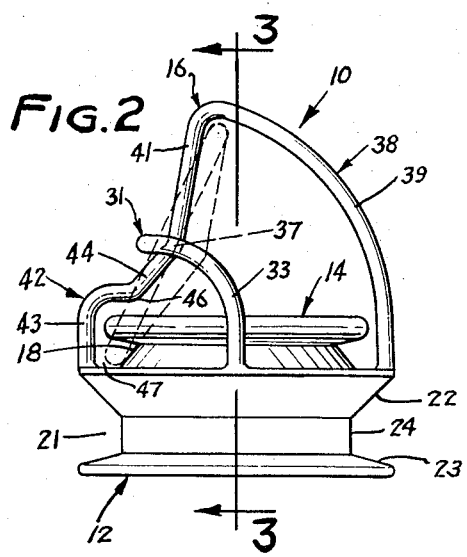
FIGURE 2 is a side view of the valve unit of FIGURE 1 with the support collar removed and showing the open and closed positions of the valve member.

The valve member 14 moves from a closed position in engagement with the top of the base 12, shown in full lines in FIGURE 2, to an open position, shown in broken lines in FIGURE 2, in response to a differential of fluid pressure between the top and bottom sides of the base 12. When the valve member 14 is in the open position the fluid pressure on the bottom side of the base 14 is greater than the fluid pressure on the top side of the base 12. Thus, fluid flows upwardly through the central opening 13 of the base 12 and through the cage 16. When the fluid pressure on the top side of the base 12 is greater than the fluid pressure on the bottom side thereof the valve member 14 is carried by the fluid to a closed position along the arcuate path defined by the open cage 16.

Figure 3:
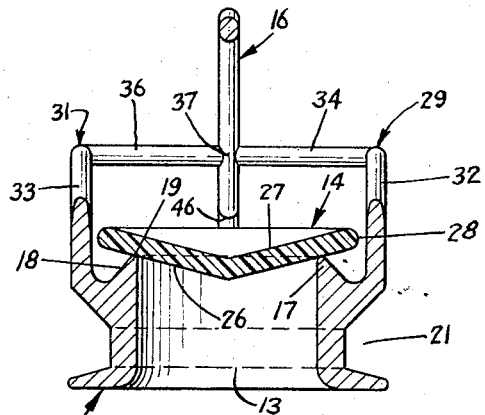
FIGURE 3 is a sectional view taken along the line 3—3 of FIGURE 2.

As shown in FIGURE 3, the base 12 has an upwardly projected annular ridge 17 circumventing the central opening 13 and providing a sealing seat for the valve member 14. The ridge 17 has an outer surface or face 18 tapered upwardly and inwardly from the top of the base 12 and joined with the circumventing wall surface of the central opening 13 by a flat annular tapered seat 19 sloped downwardly toward the axis of the opening 13.

The outer peripheral surface of the base 12 has an annular groove 21 for receiving the annular support 11. The groove 21 is defined by tapered side walls 22 and 23 connected with an annular flat base wall 24 extended axially of the opening 13.

The valve member 14 is a one piece member formed from plastic material, such as "Silastic", and has a meniscus or cone-shaped. As shown in FIGURE 3, the valve member 14 has a convex bottom surface 26 projected into the opening 13. With the valve member 14 in the closed position an annular portion of the bottom surface 26 is in sealing engagement with the annular seat 19 of the ridge 17. The bottom surface 26 is in surface engagement with the seat 19 because the angles of the tapered seat 19 and the bottom surface 26 of the valve member 14, are with respect to the horizontal plane of the base member 12, substantially identical. The top surface 27 of the valve member has a concave shape. The top and bottom surfaces 26 and 27 are joined with a peripheral edge 28 having a circular outline and semicircular shape in transverse cross-section.

The meniscus disc shape of the valve member 14 provides the valve member with directional stability in a dynamic fluid system. In the open position as shown in broken lines in FIGURE 2, the meniscus shaped disc minimizes the interference to the flow of fluid through the opening 13 as only the apex section of the valve member 14 protrudes from the periphery towards the center of the moving fluid. In the closed position the meniscus or conical configuration of the valve member 14 evenly distributes pressure of the fluids on the annular ridge 17 thereby forming an effective seal between the base 12 and valve member 14.

Figure 4:
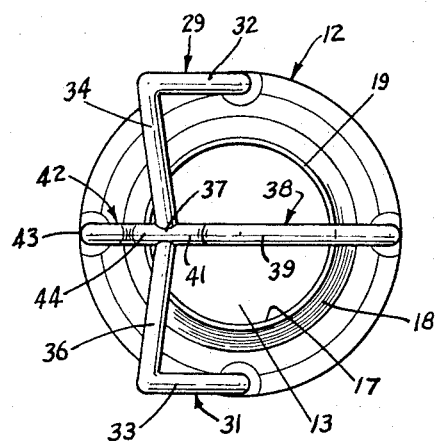
FIGURE 4 is a plan view showing the base and cage of the valve unit of FIGURE 1.

Referring to FIGURES 3 and 4, it is seen that the valve member 14 has restricted lateral movement defined by a pair of curved guide struts 29 and 31 positioned on diametrically opposite sides of the base 12 in spaced relation with the peripheral edge 28 of the valve member 14. The guide struts 29 and 31 have arcuate legs 32 and 33 secured at their lower ends to the top of the base 12 radially outwardly from the ridge 17. The legs 32 and 33 curve upwardly along the arcuate path of movement of the valve member 14 and are integral with arms 34 and 36 which converge towards each other and are joined at an apex point 37. Positioned approximately 90° from the guide struts 29 and 31 is a large swing strut 38 having an arcuate leg 39 positioned substantially concentric with the arcuate legs 32 and 33. The lower end of the leg 39 is secured to the periphery of the top of the base 12 in a spaced relation with respect to the peripheral edge 28 of the valve member 14. The opposite end of the leg 39 is integral with an arm 41 projecting downwardly and outwardly. The leg 39 is secured at its lower end to the apex point 37 formed by the arms 34 and 36.

A pivot strut 42 projects upwardly from the top of the base 12 in the upright plane of the strut 38. The pivot strut 42 has an upright leg 43 secured to the top of the base 12 radially outwardly of the ridge 17. The top of the leg 43 is integral with an angular arm 44 projected inwardly over the disc member 14 and upwardly to join with the apex point 37. The upwardly extended portion of the arm 44 is substantially parallel to the plane of the tapered outer surface 18 of the ridge 17. The mid-section of the lower portion of the arm 44 forms a knee or pivot point 46 in substantial vertical alignment with the annular seat 19 of the ridge 17. Thus, as shown in FIGURE 2 a peripheral portion of the valve member 14 extends into a pocket 47 formed by the peripheral face 18 of ridge 17, the upright leg 43 and the inwardly directed portion of the arm 44. To prevent the valve member 14 from binding or jamming in the pocket 47, all curved areas at the junctions of the leg 43 with the base 12 and the leg 43 with the arm 44 and the curvature of the knee 46 have radii of curvature equal to or greater than the radius of curvature of the peripheral edge 28 of the valve member 14.

As shown in FIGURE 2, when the valve member 14 is in the open position the concave top surface 27 (FIGURE 3) is in engagement with the arms 34, 36, 41 and 44 which converge toward each other and are joined together at the apex point 37. The angular position of the respective arms coincides with the angular shape of the top surface 27 of the valve member 14, so as to function as stops defining the extreme open position of the valve member 14. As shown in FIGURE 2, when the valve member 14 is in the open position only the apex portion of the bottom surface 26 protrudes toward the axis of the opening 13.

In operation, assuming that the valve member 14 is in the closed position, with an increase in fluid pressure in the central opening 13 of the base 12 the valve member 14 moves axially upward away from the top of the annular ridge 17. This axial movement is unobstructed until the peripheral edge 28 of the valve member 14 strikes the pivot point or knee 46 of the pivot strut 42. The flow of fluid through the opening 13 continuously forces the valve member 14 in an upward direction against the knee 46 which functions as a fulcrum predicating the arcuate movement of the valve member 14 along an arcuate path defined by the curved legs 32, 33 and 39. The valve member 14 moves along the arcuate path until it reaches its extreme open position against the converging arms 34, 36, 41 and 44. The upper section of the leg 39 confines the lower peripheral portion of the valve member 14 in the pocket 47. The ridge 17 adjacent the leg 43 prevents the lower edge of the valve member 14 from moving toward the axis of the opening 13 thus maintaining the valve member 14 in an operative open position.

The valve member 14 moves from the open position to the closed position on a decrease of fluid pressure in the opening 13. When the fluid flows in a downward direction through the opening 13, valve member 14 moves away from the arms 34, 36, 41 and 44 with portions of the bottom surface 26 and the peripheral edge 28 sliding down the peripheral face 18 and into the pocket 47. As the valve member 14 is closing, two distinct forces act to move the convex bottom surface 26 into sealing engagement with the rounded annular seat 19 of the base ridge 17. The flow of fluid moving across the back of the convex surface 26 establishes a downwardly directed force by decreasing the pressure adjacent the lower sector of the convex surface. Thus, the valve member is pulled into the main stream of the flowing fluid. In addition, the increased volume of fluid trapped behind the concave surface 27 of the valve member 14 forces the valve member 14 to the closed position. When the lower peripheral edge of the valve member 14 reaches the bottom of the pivot pocket 47, this peripheral edge begins to ride up the upright leg 43. During this arcuate movement the portion of the ridge 17 below the knee 46 functions as a fulcrum providing for the pivoting of the valve member 14 to a closed position. The valve member in the closed position rests on the inwardly sloping annular seat 19 of the ridge 17.

The following description is a specific example of an application of the valve unit 10 which is not intended to limit the application of the valve unit. Valve unit 10 is particularly adapted to be used as a prosthetic heart valve because it combines the advantages from presently used prosthetic devices without incorporating their respective disadvantages. Valve unit 10 has a minimum of pressure gradient across the valve opening and does not have localized wear and fatigue. This is accomplished by the use of a meniscus disc-type valve member 14 which is confined in a free floating manner by the use of a cage 16. The valve member 14 is free to rotate in a complete circle and thus does not have localized wear and fatigue. As specifically defined in this specification the valve member 14 is constructed of a thin and light "Silastic" material and thus the heart performs only a negligible amount of work in overcoming the static inertia of the disc in moving it to the open position and closed position.

To increase the longevity of the valve unit 10 the valve member 14 is formed from a semi-rigid material, "Silastic" or "Teflon", and the base 12 and cage 16 is formed from hard metal, stainless steel and vitallium. This combination of material has excellent wear characteristics. In addition, the liquid serves as a lubricant which contacts all the movable and engaging surfaces as the valve member 14 is floatingly assembled on the base 12 by the cage 16.

In use, the annular support 11 is a "Dacron" cloth collar which serves as a suture fixation device. The cage 16 in addition to guiding the valve member 14 along an arcuate path prevents the vessel walls of the heart and arteries from interfering with the operation of the valve member 14.

In summary, the valve unit 10 of this invention is a check valve comprising a base 12 having a passage 13 and seat means circumventing the passage. A cone-shaped disc is disposed adjacent the base 12 and is maintained in floating assembled relation with the base by an open cage 16. The disc functions as a valve member and is movable to open and closed positions with respect to the seat means. In the closed position the disc rests on the seat means. In the open position the disc is displaced from the seat means so as to permit fluid to flow through the valve unit.

It is apparent that many modifications and variations of this invention as hereinbefore set forth may be made without departing from the spirit and scope thereof. The specific embodiments described are given by way of example only and the invention is limited only by the terms of the appended claims.

We claim:

1. A valve unit for controlling the flow of a fluid comprising
    (a) a base member having a passage and an annular outwardly projected ridge surrounding said passage,
    (b) a meniscus-shaped disc having a convex surface engageable with said ridge to block the flow of fluid in one direction through the passage in said base member, said disc being arcuately movable to an open position from said ridge to permit the flow of fluid in an opposite direction through the passage in said base member, and
    (c) cage means secured to said base member and extended in an enclosed relation about said disc positioning the disc for limited floating movement adjacent said seat means, said cage means having at least a pair of spaced struts for guiding the disc for movement in an arcuate path extended outwardly of the ridge, and at least one strut providing a pivot for the disc on movement thereof to the open position, said one strut including an angularly shaped arm having a first section projected over a sector of said disc and spaced therefrom and a second laterally projected section joined to the first section with a knee, said knee being substantially positioned in axial alignment with the ridge whereby upon movement of the disc to the open position said knee functions as a fulcrum for the disc.

2. A valve unit for controlling the flow of a fluid comprising
    (a) a base member having a passage and an annular outwardly projected ridge surrounding said passage,
    (b) a meniscus-shaped disc having a convex surface engageable with said ridge to block the flow of fluid in one direction through the passage in said base member, said disc being arcuately movable to an open position from said ridge to permit the flow of fluid in an opposite direction through the passage in said base member, and
    (c) cage means secured to said base member and extended about said disc, said cage means having an arcuate swing strut and a pair of arcuate guide struts for confining the movement of the disc in an arcuate path extended outwardly of the ridge, and a pivot strut secured to said swing strut and guide struts, said pivot strut having a first section secured to the base and projected outwardly therefrom and a second section projected radially inwardly over a peripheral sector of the disc, said first and second sections and the adjacent portion of the ridge form a pocket receiving the peripheral sector of the disc, said peripheral sector of the disc on movement of the disc to the open position being confined to said pocket by the ridge.

3. The valve unit defined in claim 2 wherein a section of the pivot strut includes a knee positioned in substantial axial alignment with the ridge on the base member whereby upon movement of the disc to the open position said knee functions as a fulcrum for the disc.

4. A valve unit for controlling the flow of a fluid comprising
    (a) a base member having a passage and an annular outwardly projected ridge surrounding said passage,
    (b) a disc having a convex surface engageable with said ridge to block the flow of fluid in one direction through the passage in said base member, said disc being arcuately movable to an open position from said ridge to permit the flow of fluid in an opposite direction through the passage in said base member, and
    (c) cage means secured to said base member, said cage means having at least one first strut for guiding the disc for movement in an arcuate path extended outwardly of the ridge and at least one second strut secured to the base member adjacent said ridge, said second strut having a first section secured to the base and projected outwardly therefrom and a second section projected inward radially, said first and second sections of the second strut and the adjacent portion of the ridge form a pocket receiving a peripheral sector of the disc, said peripheral sector of the disc on movement of the disc to the open position being confined to said pocket by the ridge.

5. The valve unit defined in claim 4 wherein
    (a) said base member has a peripheral groove.

6. The valve unit defined in claim 4 wherein said cage means includes
    (a) stop means engageable by the disc on movement thereof to the extreme open position.

7. A one-way valve unit for controlling the flow of a fluid comprising
    (a) a base member having a passage and seat means circumventing said passage,
    (b) disc means having a surface engageable with said seat means to block the flow of fluid in one direction through said passage, said disc means being movable along an arcuate path away from the seat means thereby allowing fluid to flow in an opposite direction through said passage,
    (c) guide means secured to the base member and extended about said disc means, said guide means having means for directing the movement of the disc in said arcuate path and at least one strut secured to the base outwardly of the seat means, said strut having a first section secured to the base and projected outwardly therefrom and a second section projected inward radially, said first and second sections of the strut and the adjacent portion of the base forming a pocket receiving a peripheral sector of the disc means, said peripheral sector of the disc means on movement of the disc means to the open position being confined to said pocket by the adjacent portion of the base member.

8. The valve unit defined in claim 7 wherein said disc means comprises
    (a) a one piece disc having a convex curved surface engageable with the seat means.

9. A valve unit for controlling the flow of a fluid comprising
    (a) a base member having a passage and an outwardly projected ridge surrounding said passage,
    (b) a disc having a surface engageable with said ridge to block the flow of fluid in one direction through the passage in said base member, said disc being arcuately movable to an open position from said ridge on one side of the center line of the passage to permit the flow of fluid in an opposite direction through the passage in the base member,
    (c) cage means secured to said base member positioning the disc for limited universal movement relative to said ridge, said cage means having first means for guiding the disc for movement in an arcuate path extended outwardly of the ridge to the open position beyond the center line of the passage and second means secured to the base member adjacent said ridge for controlling the movement, said second means having a first section secured to the base and projected outwardly therefrom and a second section projected inward radially, said first and second sections and the adjacent portion of the ridge form a pocket receiving a peripheral sector of the disc, said peripheral sector of the disc on movement of the disc to the open position being confined to said pocket by the ridge.

References Cited

UNITED STATES PATENTS

| | | | |
|---|---|---|---|
| 1,674,235 | 6/1928 | Bateman | 251—156 |
| 3,099,016 | 7/1963 | Edwards | 137—533.13 |
| 3,263,239 | 8/1966 | Edwards | 137—533.11 |
| 2,603,452 | 7/1952 | Spinney | 137—543.19 |
| 2,754,844 | 7/1956 | Blackford | 137—543.19 |
| 2,949,931 | 8/1960 | Ruppright | 137—533.19 |
| 3,113,586 | 12/1963 | Edwards. | |
| 3,130,419 | 4/1964 | Edwards. | |

OTHER REFERENCES

The Journal of Thoracic and Cardiovascular Surgery, vol. 46, December 1963, No. 6, pp. 719–725.

Washington Post, Nov. 24, 1963, "Pioneer Invents New Heart Valve," Nate Haseltine.

ALAN COHAN, *Primary Examiner.*

W. H. WRIGHT, *Assistant Examiner.*